UNITED STATES PATENT OFFICE.

HILDA SWANSON, OF DENVER, COLORADO.

POLISHING COMPOUND.

1,381,250.  Specification of Letters Patent.  Patented June 14, 1921.

No Drawing.  Application filed May 17, 1919. Serial No. 297,938.

*To all whom it may concern:*

Be it known that I, HILDA SWANSON, a citizen of the United States, residing at Denver, in the county of Denver and State of Colorado, have invented certain new and useful Improvements in Polishing Compounds, of which the following is a specification.

This invention relates to a composition of matter for polishing silver, gold, glassware and other substances, and the process of producing the same, and it is the primary object of my invention to provide a paste of creamy consistency which will quickly remove stains and dirt from metals or glassware and impart a brilliant luster thereto, and which remains indefinitely in a condition for immediate use.

Another object of the invention is to provide a polishing cream which is free from greasy matter and does not injure the surfaces to which it is applied.

With these objects in view, my improved polishing paste is composed of a mixture of commercial white naphtha soap, commercial baking powder, precipitated chalk and water.

In preparing the composition I prefer to use the ingredients in about the following proportions:

8 ounces water,
1¾ ounces white naphtha soap,
4 ounces precipitated chalk,
3 drams commercial baking powder.

The soap is first of all dissolved in the above-mentioned quantity of water by boiling, after which the chalk is added and the solution again brought to the boiling point.

The mixture is subsequently removed from the fire and the baking powder added after which the different ingredients are thoroughly mixed and incorporated by beating the mixture until it has the consistency of a fluffy cream.

The composition thus produced is drawn into the receptacles in which it is sold and permitted to cool.

The composition remains indefinitely in its cream-like condition and may be used by rubbing it upon the articles to be polished or by dissolving a small quantity in water in which the articles are washed or boiled.

In using the term "commercial baking powder" I refer to the chemical mixture generally used for raising biscuits, cake, etc., the chief constituents of which are alkali bitartrate and bicarbonate of soda usually combined in proportions of approximately sixty parts of the one to forty parts of the other. The baking powder must be chemically pure and free from alum and other similar ingredients.

White naphtha soap which is another commercial article, is the only soap at present known to me which is adapted for use in the composition, it having been found by most carefully conducted experiments that other soaps do not give the desired results.

The precipitated chalk is also an essential ingredient of the composition, no other chalk being adapted for the purpose.

I am aware that precipitated chalk and certain of the ingredients of baking powder, such as bicarbonate of soda and cream of tartar have been used heretofore in similar compositions, and I do not broadly claim the use thereof. What I do claim as my invention, however, is the use of chemically pure commercial baking powder and commercial white-naphtha soap in intermixture with the precipitated chalk and water, preferably in the proportions stated, and the process of intermixing these substances into a permanent paste of creamy consistency.

Having thus described my invention what I claim and desire to secure by Letters-Patent is:

1. The process of producing a polishing cream consisting in first dissolving commercial white naphtha soap in boiling water, then adding precipitated chalk to the solution, then heating the solution to the boiling point, then removing the mixture from the fire, then adding thereto a mixture of alkali bitartrate and bicarbonate of soda in powder form, and finally beating it into a cream.

2. A polishing cream formed of water, commercial naphtha soap, precipitated chalk, alkali bitartrate and bicarbonate of soda.

3. A polishing cream formed of water 8 parts, commercial naphtha soap 1.75 parts, precipitated chalk 4 parts and commercial baking powder .4 parts.

4. A polishing cream formed of water 8 parts, commercial naphtha soap 1.75 parts, precipitated chalk 4 parts, alkali bitartrate from .23 to .25 parts and bicarbonate of soda from .15 to .16 parts.

In testimony whereof I have affixed my signature.

HILDA SWANSON.